Figure 1:
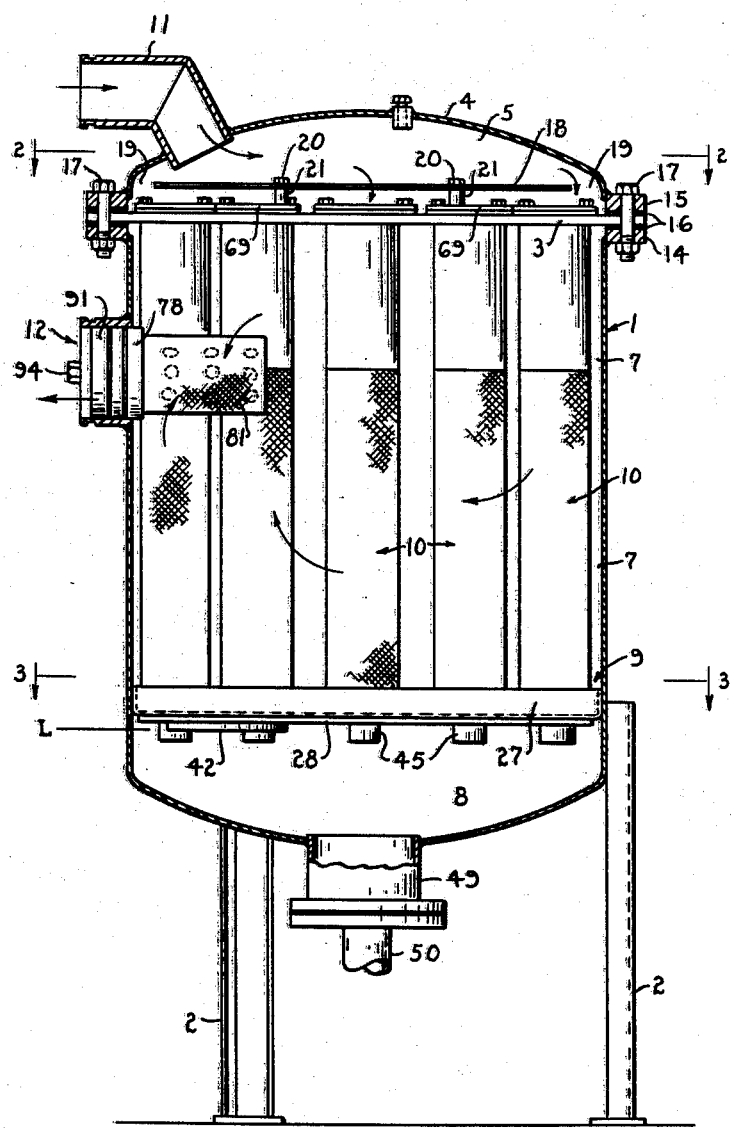

Feb. 23, 1965 C. H. MAY 3,170,873
WATER FILTER-SEPARATOR
Filed July 7, 1958 4 Sheets-Sheet 2

INVENTOR.
Clifford H. May
BY Albert L. Jeffers
ATTORNEY

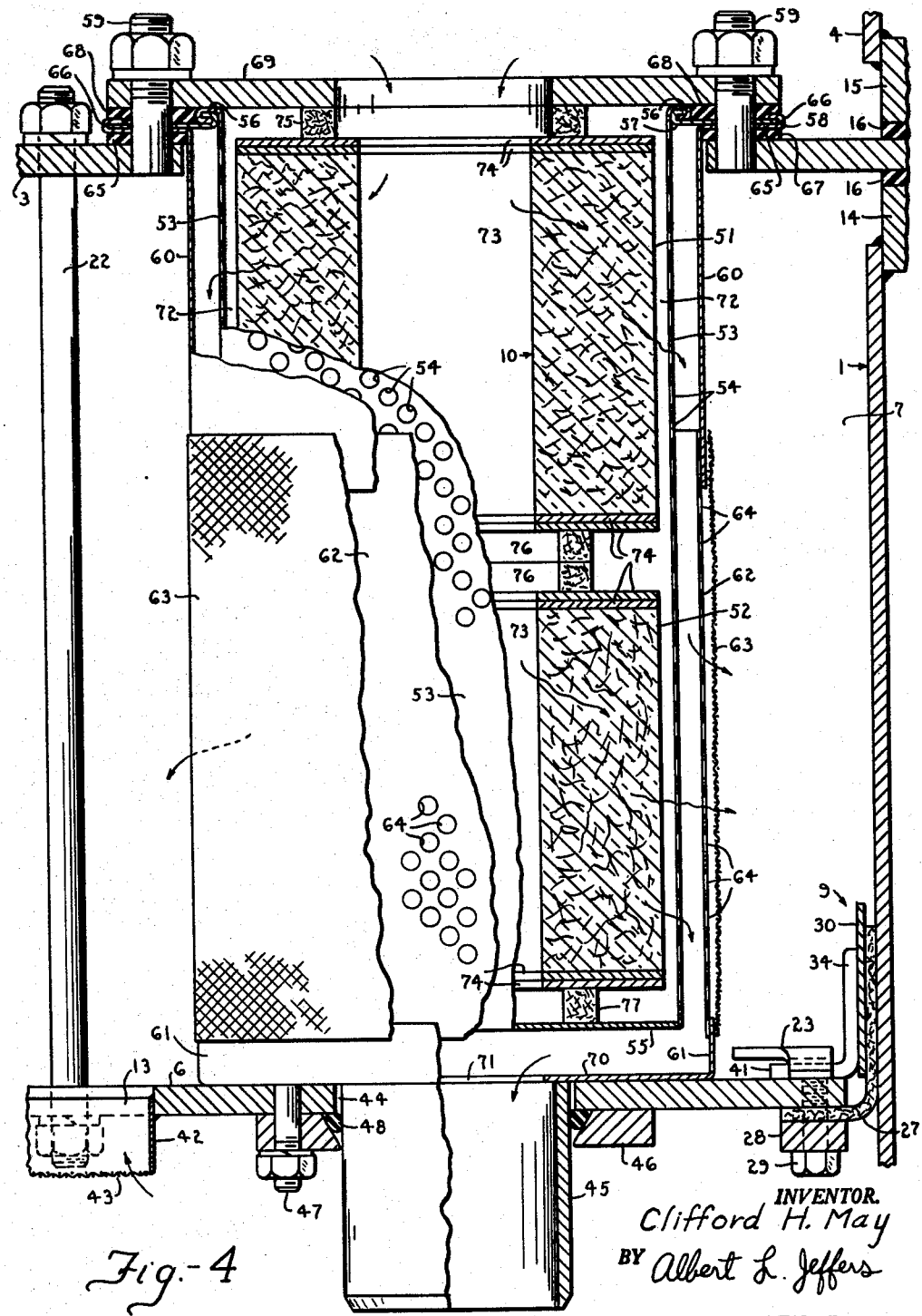

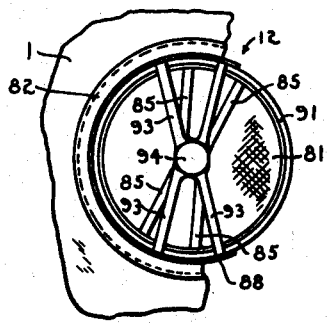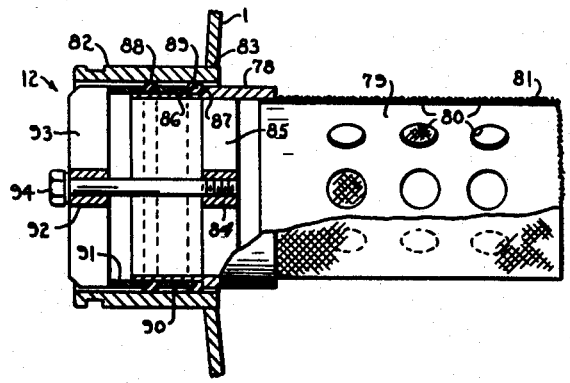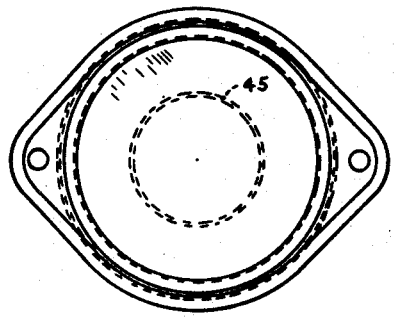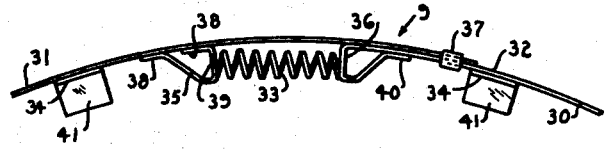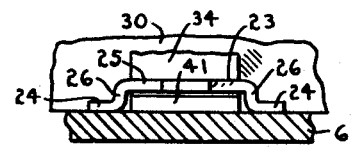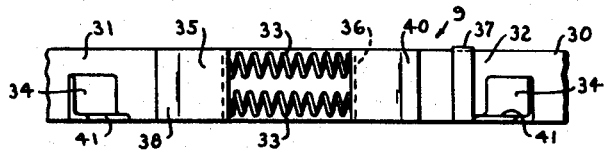
INVENTOR.
Clifford H. May
BY Albert L. Jeffers
ATTORNEY

United States Patent Office 3,170,873
Patented Feb. 23, 1965

3,170,873
WATER FILTER-SEPARATOR
Clifford H. May, Fairfax, Va., assignor to The Briggs Filtration Company, Washington, D.C., a corporation of Maryland
Filed July 7, 1958, Ser. No. 746,777
3 Claims. (Cl. 210—307)

The invention relates generally to means for conditioning a liquid and more particularly is directed to apparatus or a system which serves to remove substantially all foreign matter, and particularly water, from liquids, such as light fuels and petroleum, solvents and distillates.

The apparatus is particularly designed and constructed for use in purifying fuels used in aircraft engines where efficient operation is of prime importance. The invention in actual use has proven exceptionally advantageous in filtering and dehydrating such fuels so as to positively assure freedom from engine failure or erratic operation, incomplete combustion, corrosion and undue accumulation of carbon deposits frequently due to sludge and water.

With the above in mind, a significant object of the invention is to provide an apparatus or system embodying improved principles of design and construction comprising, among other things, a tank having an entrance chamber, a lower water receiving chamber, a relatively large separating or circulating chamber, a plurality of filter means or assemblies extending longitudinally in the separating chamber for filtering out the water from the contaminated fuel and directing it to the lower chamber so that it will not flow into the separating chamber and out through an outlet means communicatively connected thereto. The subject apparatus affords a highly efficient filter-separator having a wide margin of safety factor in operation and substantially prevents carry over of water into the fuel outlet at high flow rates.

An important object of the invention is to provide a header, a partition and filter means secured therebetween to constitute an assembly for disposition in the tank.

An additional object of the invention is to provide a header with a baffle disposed in the entrance chamber to assist in distributing the unfiltered fuel to the filter means.

A particular object of the invention is to provide a partition with a unique detachable device for sealing the partition in the tank.

Another object of the invention is to provide a filter means comprising, among other things, a casing provided with filter units or elements therein, including means, common to the casing and units, for simultaneously supporting the casing and holding or compressing the units.

A specific object of the invention is to provide the partition with a relatively large opening whereby the filtered liquid initially in the lower chamber may find its way back to the separating chamber through this opening, as it is displaced by water settling in the lower chamber.

Also, an object of the invention is to provide a novel way of detachably sealing the lower extremities of the filter assemblies with respect to openings or passages provided in the partition.

A further object of the invention is to provide outlet means, embodying improved principles of design and construction.

The structure embodying the subject invention also offers advantages with respect to manufacture and assembly, installation, durability, replacement of filter means, automatic and efficient operation, and low cost of maintenance and repair.

Additional objects and advantages of the invention will become apparent after the description hereinafter set forth is considered in conjunction with the drawings annexed hereto.

Figure 2:
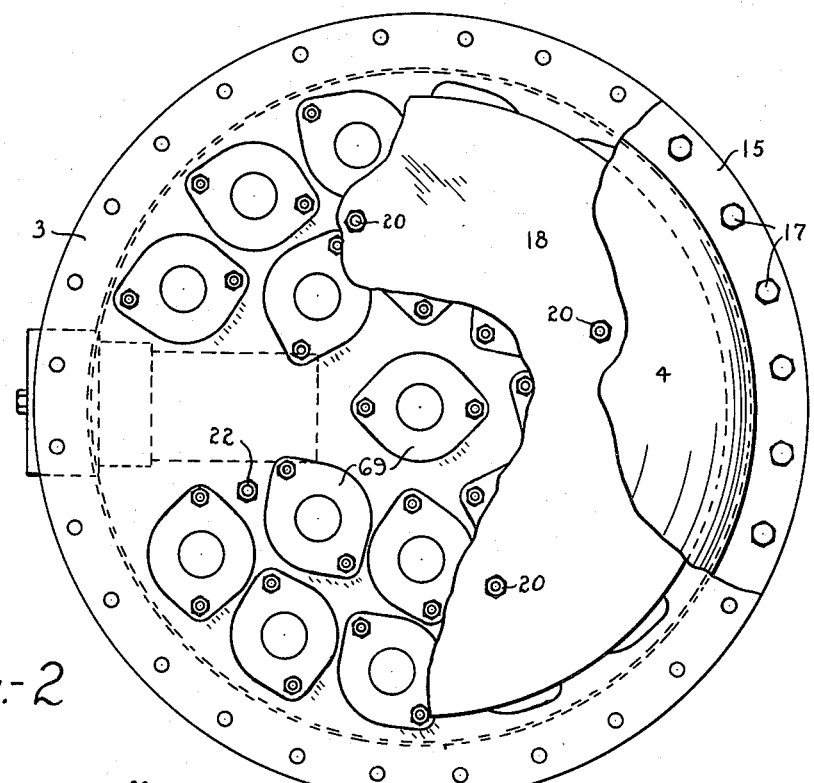
Figure 3:
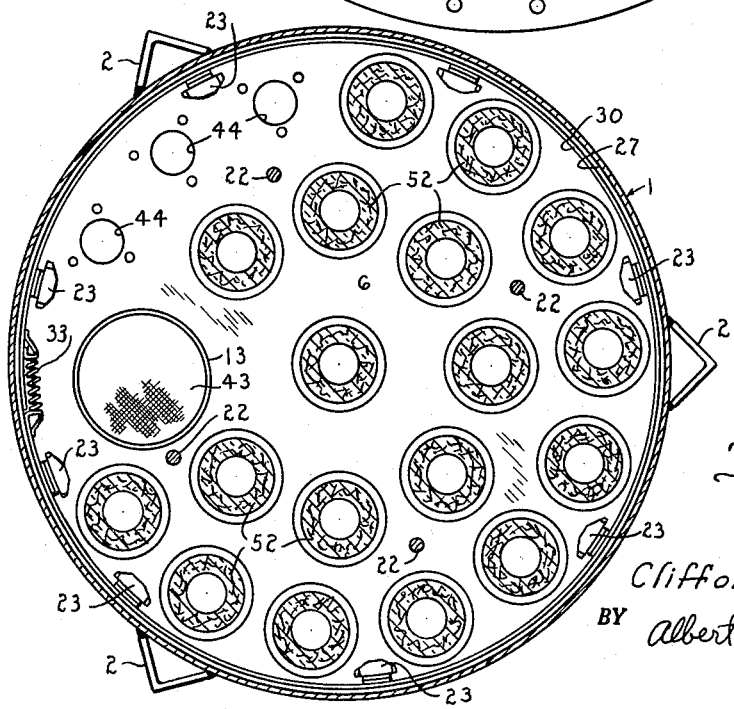

In the drawings:
FIGURE 1 is a vertical section taken through the apparatus;
FIGURE 2 is a horizontal section taken substantially on line 2—2 of FIGURE 1, illustrating details of certain of the upper structure of the apparatus;
FIGURE 3 is a horizontal section taken substantially on line 3—3 of FIGURE 1 depicting certain of the lower structure;
FIGURE 4 is an enlarged partial vertical section of the structure showing the character of the filter units and mode of mounting same;
FIGURE 5 is an enlarged partial horizontal section of a fuel outlet assembly;
FIGURE 6 is an end view of the assembly shown in FIGURE 5;
FIGURE 7 is an enlarged partial top view of a device employed in sealing a horizontal partition in place within the confines of a tank constituting a component of the apparatus;
FIGURE 8 is an elevational view of the structure shown in FIGURE 7;
FIGURE 9 is a top view of one of the plurality of filter means or assemblies utilized in conjunction with the apparatus; and
FIGURE 10 is a section depicting the mode of attaching a part of the holding means to the partition.

Referring more particularly to the drawings, the apparatus comprises, among other things, a tank generally designated 1 supported in a vertical position by legs 2, a horizontal header or mounting plate 3 detachably connected between the tank and a cover 4 to define an upper inlet or entrance chamber 5, a horizontal partition 6 connected to the header 3 dividing the tank into an intermediate separating or circulating chamber 7 and a lower chamber 8, a device generally designated 9 for sealing the partition in the tank, a plurality of individual filter means or assemblies generally designated 10 secured between a header or deck plate and the partition and communicatively connected with the chambers. The fuel or other liquid to be filtered is introduced into the inlet chamber through an inlet 11 and flows through the filter means 10 where the water and other foreign matter are substantially separated from the fuel so that the filtered fuel may flow out through outlet means generally designated 12 provided in the intermediate or separating chamber and the water and foreign matter may gravitate between components of the filter means into the lower chamber as will be explained subsequently. The arrangement is preferably such that the fuel initially in the lower chamber as well as any filtered fuel which should later escape into the lower chamber may be caused to flow back into the separating chamber when the water lever rises in the lower chamber. The fuel thus displaced passes through a filtered passage or opening 13 in the partition for discharge through the outlet means 12.

The upper end of the tank is provided with a reenforcing annular flange 14 and the cover with a similar flange 15, which flanges are preferably respectively secured to the tank and cover by welding. The header or deck plate 3 is detachably secured between the flanges and interposed gaskets 16 by a plurality of bolts 17 which extend through holes provided therefor in the flanges, header and gaskets to seal the header in place.

A planar baffle member 18 is detachably secured in a predetermined spaced parallel relationship to the header as depicted in FIGURES 1 and 2 so as to promote distribution of the unfiltered fuel within the entrance or inlet chamber and through an annular passage 19, defined by the peripheries of the baffle and cover, to the filter means 10. The baffle is preferably secured by means of screws or bolts 20 connected to the header and tubular spacers 21 disposed about the shanks of the screws or bolts.

As depicted in FIGURES 1, 3 and 4, the header or deck plate 3 is detachably secured in axially spaced relationship to the partition 6 by a plurality of relatively long bolts 22, with the filter means 10 interposed between the header and partition to constitute an assembly which may be readily detachably mounted in the tank.

The partition is primarily supported by the header and is sealed in the tank in a unique manner which will now be described before the filter means are considered in detail. The partition is preferably made in the form of a flat plate having a diameter somewhat less than the internal diameter of the tank as depicted in FIGURE 4 of the drawing. The upper side of the partition adjacent its periphery is provided with a plurality of circumferentially spaced fasteners 23 having ends 24 which are preferably secured to the partition by spot welding. These fasteners are formed to provide receiving means defined by a top wall 25 and side walls 26 as shown in FIGURES 4 and 10, the purpose of which will be described subsequently. A flexible annular gasket 27 is detachably secured against the underside of the partition adjacent its periphery by an annular ring member 28 and screws 29 which extend through the member and gasket and threadedly connect with the partition as shown in FIGURE 4. The diameter of the gasket is somewhat greater than the diameter of the partition so that its free marginal annular edge portion may be flexed and interposed between the inner cylindrical surface of the tank and the device 9.

The device 9 is preferably of an expansible-contractible character and is unique in design and construction. It is preferably comprised of a resiliently flexible annular ring 30 having end extremities 31 and 32 which are secured in overlapping slidable relationship, a pair of helical springs 33 for normally urging the ring to an expanded condition and a plurality of L-shaped fittings 34 which are preferably spot welded to the inner side of the ring at circumferentially spaced locations for connection with the fasteners 23 on the partition.

As depicted in FIGURES 7 and 8 the end extremity 31 of the ring is provided with an abutment member 35 fixedly secured on its inner side at a location spaced an appreciable distance from the end of the extremity and the other extremity 32 is formed to provide an abutment 36. A loop or guide member 37 is attached to the extremity 32 in spaced relation to the abutment 36 for receiving the extremity 31. The members 35 and 36 are preferably respectively welded to the extremities of the ring. The member 35 is preferably formed to include a pair of end portions 38 welded to the extremity 31 and an intermediate portion 39 which forms an abutment for the springs. The abutment 36 is preferably formed to provide a portion similar to the portion 39 of the abutment 35 for engaging the springs and an end portion 40 welded to the extremity 31. The ends of the springs 33 are interposed between and engage the abutments for normally urging the abutments and extremities carrying them in opposite directions to expand the size of the ring 30. When the ring is expanded or contracted the extremity 32 will slide against the outer surface of the extremity 31 and be guided by the loop member 37.

Prior to placing the assembly comprising the header, partition and filter means, into the tank, the device 9 is mounted on the partition and contracted so that inturned legs 41 of the fittings 34 will project into the receiving means of the fasteners 23, after which the assembly is lowered into the tank to cause the free annular edge portion of the gasket 27 to automatically fold back and forcibly engage the inner cylindrical surface of the tank through the agency of the springs 33 to firmly seal the partition in the tank.

The partition is provided with the relatively large opening 13, above referred to, which is preferably disposed below the fuel outlet means 12. A relatively short tubular part 42 has its upper end preferably secured in the opening by welding and a filter 43, preferably in the form of a fine or 100 mesh screen, is welded in the lower end of the member as best depicted in FIGURES 3 and 4. The partition is also provided with a plurality of openings 44 which are adapted to receive tubular members 45 extending from the filter means 10. Rings 46 are detachably secured to the underside of the partition by bolts 47 which extend through the rings and threadedly connect with the partition for compressing a gasket 48 about the end of each of the tubular members 45 for sealing these members with respect to the openings 44 through which they extend. It will be noted that the opening in each of the rings is substantially conical in shape for camming each gasket into intimate engagement with the partition 6 and the tubular members 45 to produce sealed connections.

The bottom wall of the tank 1 below the partition 6 is preferably made concave and provided with a depending sump 49 into which the water and/or foreign matter may flow or fall for release through a conduit 50 when desired.

The filter means 10 which will now be described may be designed and constructed in various ways but as exemplified herein they are primarily supported on the header or deck plate 3 and constructed as best shown in FIGURE 4. Each filter means includes, among other things, an inner perforated casing within which a pair of aligned filter units or elements 51 and 52 are preferably disposed and supported and an outer casing or shell concentrically surrounding the inner casing. The inner casing comprises a cylindrical wall 53 which is perforated with relatively small openings or passages 54, and a closed bottom wall 55 which supports the units. The upper end of the cylindrical wall 53 is preferably formed to provide an annular receiving flange 56 which interlocks with a receiving flange 57 formed on a ring member 58 having holes therein through which the shanks or bolts 59 extend.

The outer casing or shell of each filter means preferably includes an upper cylindrical member 60, a lower cup member 61, and an intermediate perforated cylinder 62 having its ends secured in overlapping relation to the inner surfaces of the upper and lower members. The outer casing also preferably includes a cylindrical screen member 63 having its ends secured in overlapping relation to the outer surfaces of the members 60 and 61 to provide a cylindrical space between the perforated member 62 and the screen. The cylinder 62 is provided with holes or passages 64 which are of substantially the same size as those in the cylindrical wall 53 of the inner casing. The upper end of the upper cylindrical member 60 is provided with an outwardly extending radial portion 65 having a receiving flange 66 thereon which interlocks with the peripheral edge of the ring 58. The flange 65 is provided with holes through which the shanks of the bolts 59 extend to secure at least the upper extremities of the inner and outer casings in a concentric spaced relationship to provide a cylindrical space or chamber therebetween. A gasket 67 is preferably disposed between the header 3 and the radial portion 65 of the member 62 and a gasket 68 between the ring 58 and a clamping member 69 to seal the casings in place. It will be noted that the opening in the gasket 68 through which the inner casing extends may be somewhat smaller in diameter than the opening in the gasket 67 through which the outer casing extends and that the ring member 58 supports the inner casing. The cup member 61 includes a cylindrical wall to which the members 62 and 63 are attached and a bottom wall 70 provided with an opening 71.

Each of the tubular members 45, above referred to, is preferably secured to the underside of the bottom wall 70 of each cup 61 in concentric relation about the opening 71 therein. The cup is supported on the partition and the tubular members extend through the openings 44 provided therefor in the partition 6.

The filter units or elements 51 and 52 may be designed and constructed in various ways but are preferably identical and each is comprised of fibrous glass material which is compressed into a relatively compact tubular cylindrical porous mass. It will be noted by referring to FIGURE 4 that the diameters of the units are somewhat less than the diameter of the inner casing so as to define an annular chamber or passage 72 therebtween which is concentric to longitudinal passages 73 provided in the units. Pairs of washers 74 are respectively secured to the ends of each unit and a gasket 75 is disposed between the washers 74 at the upper end of the unit 51 and the clamping member 69, a pair of gaskets 76 between the washers at the opposed ends of the units and a gasket 77 between the washers at the lower end of the unit 52 and the bottom wall 55 of the inner casing of the filter assembly. The clamping members, including the washers 74 and gaskets 75, 76 and 77 are each provided with an opening, which openings are axially aligned with one another and the longitudinal passages 73 in the units so that the unfiltered fuel may readily flow into the units from the inlet chamber 5 and then radially outward through the mass of fibers. The clamping members 69 and/or the bolts 59 serve to hold the filter units, washers, gaskets and casings in place and these components may be readily removed for repair or replacement when required by merely running the bolts and/or nuts thereof.

The outlet means generally designated 12 for the filtered fuel will now be described. This means may be designed and constructed in different ways but as exemplified, particularly in FIGURES 5 and 6 of the drawings, it preferably includes a tubular mounting 78, a tubular member 79 provided with openings or passages 80, and an outer casing 81 of fine mesh screen constituting a filter. These components are preferably connected together to constitute an assembly or unit which can be readily detachably mounted in a tubular extension 82 extending outwardly from the tank and communicating with the separating chamber 7 at a location below the header 3 and above the opening 13 in the partition 6. More particularly in this regard, one end of the tubular member 79 is secured in the inner end of the mounting 78 and the screen filter casing 81 is secured snugly about the member 79 and across the opposite end of the latter. The inner end of the tubular extension 82 is preferably secured by welding in an opening 83 provided in the cylindrical wall of the tank and the assembly just described is detachably mounted in the extension.

The inner extremity of the tubular mounting 78 is provided with a centrally disposed tubular internally threaded part 84 secured in place by a plurality of spokes or radial formations 85. The outer extremity of the mounting is preferably formed to provide a cylindrical portion 86 and a shoulder 87, the outside diameter of said portion being somewhat less than the outside diameter of the inner extemity of the mounting. A pair of gaskets 88 and 89 are mounted on the cylindrical portion 86 of the mounting and held in axially spaced relationship by an annular spacer 90 and the gasket 89 engages the shoulder 87.

A clamping ring 91 is also mounted on the outer extremity of the mounting and engages the gasket 88. This ring is provided with a central tubular part 92 secured in place by a plurality of spokes 93. A screw 94 extends freely through the tubular part 92 and is threadedly connected to the part 84 in a manner whereby when the screw is tightened the ring 91, spacer 90 and tubular mounting 78 will compress the gaskets 88 and 89 and cause them to expand into intimate engagement with the mounting and tubular extension 82 to provide double sealed connections between the mounting and extension. By merely loosening the screw the complete assembly may be easily removed from the extension for repair or replacement.

In view of the foregoing, it will be manifest that when contaminated liquid such as fuel is introduced under pressure into the entrance chamber 5 through the inlet 11, it will flow through the annular passage 19, due to the baffle 18, under the baffle and into the filter assemblies 10. The filter assemblies afford a setup whereby the liquid in flowing radially outward through the filter units 51 and 52, the openings or passages 54 and 64 in the inner and outer casings and through the screen filters 63, will cause any water in the liquid to coalesce or form into small droplets within the filter units and pass therethrough along with the liquid through the openings 54 in the cylindrical wall 53 of the inner casing and into the annular chamber between the casings, from whence the liquid in flowing through the openings 64 in the cylinder 62 and screen filter 63 and into the separating chamber 7 will cause the water droplets to accumulate on the inner surface of this screen and in due course fall downwardly into the annular chamber defined by the casings 53 and 60 and through the depending tubular member 45 of each assembly into the lower chamber 8 and eventually into the sump 49 where it can be drained away through the conduit 50. Substantially all of the water separated from the liquid passes into the lower chamber through the members 45 but if any water should pass along with the filtered liquid through the screen filter 63 it will fall into the bottom of the separating chamber 7 and thence down through the screened opening 13 into the lower chamber. The filtered liquid after passing through the screen filters 63 of the filter assemblies eventually flows through the outlet means 12 and a conduit or pipe (not shown) which may be attached to the tubular extension 82. Any foreign matter and/or water droplets which may be carried over with the filtered liquid and does not fall directly toward the partition will be arrested by the filter screen 81 and eventually fall substantially directly into the opening 13 positioned below the screen 81.

Attention is directed to the fact that some of the filtered liquid may find its way into the lower chamber 8 through the tubular members 45 and the opening 13 in the partition 6 and if the water and/or foreign matter in the lower chamber is at the level indicated at L in FIGURE 1, the liquid will be maintained at this level due to the difference in the specific gravities of the water and fuel. In other words, any filtered fuel in the lower chamber forms what may be termed a barrier between the water in the lower chamber and the filtered fuel in the separating chamber 7 in order to further remove all water and foreign matter from the liquid fuel. If the level of the water in the lower chamber should rise the filtered fuel therein will of course rise and flow back into the separating chamber through the opening 13 and eventually through the outlet means 12 for the use intended.

In view of the foregoing it will be manifest that improved means have been provided for filtering a liquid, such as a liquid fuel, for efficiently removing water and/or foreign matter therefrom; that a novel setup is provided for supporting the partition and clamping the filter assemblies between the deck plate and partition, including unique means for sealing the partition in the tank and the filter assemblies with respect to the partition so as to substantially retain the filtered fluid within the separating chamber; and that the filter assemblies and fuel oulet means embody principles of design and construction.

Having thus described my invention, it is obvious that various modifications may be made in the same without departing from the spirit of the invention, and, therefore, I do not wish to be understood as limiting myself to the exact form, construction, arrangement, and combination of parts herein shown and described.

I claim:
1. In combination: a vertical cylindrical tank having a bottom wall and an open upper end, a header secured across the open end, a cover having inlet means secured to the tank over the header and forming therewith an entrance chamber for unfiltered liquid containing some emulsified water, the improvement comprising: a partition sealed in the tank below the header and forming therewith and the bottom wall a separating chamber and a lower chamber, said header and partition each having at least one opening therein, at least one filter coalescer element secured in the separating chamber between the header and partition for coalescing the water in the liquid into droplets as the liquid flows therethrough, said filter coalescer element being sealed about the opening in said header and communicating therewith, screen means surrounding and spaced from the filter coalescer element and communicating with the opening in the partition for directing the water droplets through the opening in the partition into the lower chamber while passing the filtered liquid into the separating chamber, means for sealing said screen means about the openings in the header and partition, outlet means disposed in the separating chamber for the filtered liquid, and water drain means disposed in the lower chamber for discharging the water.

2. A dehydrator and filter for fuels comprising, in combination, a cylindrical tank, a first annular partition disposed adjacent one end of the tank forming an inlet chamber having a fuel inlet and an outlet chamber having a fuel outlet, a second annular partition disposed adjacent the other end of the tank forming a water outlet chamber having a water outlet, a water and filter coalescer separator unit disposed between the first partition and the second partition, said filter coalescer separator unit communicating with the inlet chamber and provided with means for directing the water to the water chamber while passing the filtrate to the outlet chamber, receiving means carried by the second partition and circumferentially spaced thereon, an annular ring having overlapping extremities and radially disposed means extending into the receiving means, inwardly projecting abutments carried by the extremities, an annular gasket interposed between the peripheral edge of the partition and the tank, said annular gasket being connected to the partition and disposed exteriorly and coextensive with said annular ring, and resilient means acting on the abutments to cause the ring to expand and force the gasket against the cylindrical tank to seal the second partition between the fuel outlet chamber and water outlet chamber.

3. In combination: a cylindrical tank, a first annular partition disposed adjacent one end of the tank forming an entrance chamber having inlet means and an intermediate chamber, said intermediate chamber provided with a filtrate outlet, a second annular partition disposed adjacent the other end forming a water outlet chamber having a water outlet means, a filter-water coalescer element disposed between the first partition and the second partition and communicating with said entrance chamber, fastening means carried by the second partition, an annular ring having overlapping extremities and means connected to the fastening means on the second partition, inwardly projecting abutments carried by the extremities, an annular gasket connected in sealing relationship with said second partition and interposed between the peripheral edge of the ring and the tank, said annular ring being interiorly coextensive with the annular gasket, and resilient means acting on the abutments to cause the ring to expand and force the gasket against the tank to seal said partition in the tank between the water outlet chamber and the intermediate chamber.

References Cited in the file of this patent
UNITED STATES PATENTS

| | | |
|---|---|---|
| 430,517 | Fenner | June 17, 1890 |
| 930,401 | Monteagle | Aug. 10, 1909 |
| 1,000,563 | Steedman | Aug. 15, 1911 |
| 1,003,398 | Britzius | Sept. 12, 1911 |
| 1,211,344 | Peters | Jan. 2, 1917 |
| 1,222,363 | Christenson | Apr. 10, 1917 |
| 1,657,318 | Price | Jan. 24, 1928 |
| 1,673,751 | Lawrence | June 12, 1928 |
| 1,735,007 | Lanes | Nov. 12, 1929 |
| 1,765,097 | Robertson | June 17, 1930 |
| 1,945,524 | Foehr | Feb. 6, 1934 |
| 1,967,785 | Schact | July 24, 1934 |
| 2,377,373 | Robertson | June 5, 1945 |
| 2,597,475 | Grise | May 20, 1952 |
| 2,657,808 | Mankin | Nov. 3, 1953 |
| 2,667,273 | Gardes | Jan. 26, 1954 |
| 2,703,188 | Blanchette et al. | Mar. 1, 1955 |
| 2,754,005 | Tursky | July 10, 1956 |
| 2,811,218 | Winslow | Oct. 29, 1957 |
| 2,858,027 | Fulton et al. | Oct. 28, 1958 |

UNITED STATES PATENT OFFICE
CERTIFICATE OF CORRECTION

Patent No. 3,170,873                      February 23, 1965

Clifford H. May

It is hereby certified that error appears in the above numbered patent requiring correction and that the said Letters Patent should read as corrected below.

Column 2, line 53, for "lever" read -- level --; column 4, line 38, for "or" read -- of --.

Signed and sealed this 10th day of August 1965.

(SEAL)
Attest:

ERNEST W. SWIDER                      EDWARD J. BRENNER
Attesting Officer                       Commissioner of Patents